United States Patent [19]

Brinker

[11] Patent Number: 4,499,361
[45] Date of Patent: Feb. 12, 1985

[54] LASER BEAM INTERRUPTER AND DIVIDER

[75] Inventor: Reiner G. Brinker, Mechanicsville, Va.

[73] Assignee: Philip Morris Incorporated, New York, N.Y.

[21] Appl. No.: 490,566

[22] Filed: May 2, 1983

[51] Int. Cl.$^3$ .............................................. B23K 27/00
[52] U.S. Cl. ................. 219/121 LK; 131/281; 219/121 LP; 219/121 LR; 219/121 LS; 219/121 LT
[58] Field of Search ............ 219/121 LK, 121 LL, 219/121 LP, 121 LQ, 121 LR, 121 LS, 121 LT, 121 LU, 121 LW, 121 LY; 350/6.3, 6.4; 131/281

[56] References Cited

U.S. PATENT DOCUMENTS

| | | | |
|---|---|---|---|
| 2,423,718 | 7/1947 | Morrison | 88/2.3 |
| 2,547,623 | 4/1951 | Cockrell | 346/33 |
| 3,022,704 | 2/1962 | Cary | 356/324 |
| 3,106,642 | 10/1963 | Shapiro | 250/83.3 |
| 3,173,993 | 3/1965 | Smith et al. | 178/69.5 |
| 3,303,739 | 2/1967 | Chitayat | 350/286.2 |
| 3,419,321 | 12/1968 | Barber et al. | 350/8 |
| 3,537,306 | 11/1970 | Bedinger | 73/170 |
| 3,576,965 | 5/1971 | Gugger | 219/121 LV |
| 3,594,261 | 7/1971 | Broerman | 219/121 L X |
| 3,721,965 | 3/1973 | Morgan-Voyce | 350/169 |
| 3,740,560 | 6/1973 | Wentz | 250/199 |
| 3,799,657 | 3/1974 | Dager et al. | 219/121 L X |
| 3,819,277 | 6/1974 | Berthelot et al. | 356/204 |
| 3,865,564 | 2/1975 | Jaeger et al. | 219/121 L X |
| 3,943,324 | 3/1976 | Haggerty | 219/121 L X |
| 3,981,705 | 9/1976 | Jaeger et al. | 219/121 L |
| 4,118,109 | 10/1978 | Crawford et al. | 350/285 |
| 4,118,619 | 10/1978 | McArthur et al. | 219/121 L |
| 4,153,369 | 5/1979 | Kallet et al. | 356/318 |
| 4,348,108 | 9/1982 | Shindow | 350/6.4 X |

FOREIGN PATENT DOCUMENTS

| | | |
|---|---|---|
| 925798 | 5/1963 | United Kingdom . |
| 1368819 | 10/1974 | United Kingdom . |
| 2027628 | 2/1980 | United Kingdom . |
| 2032323 | 5/1980 | United Kingdom . |

*Primary Examiner*—C. L. Albritton
*Attorney, Agent, or Firm*—Thomas L. Giannetti; Jeffrey H. Ingerman

[57] ABSTRACT

Optical apparatus for converting a single, continuous incident laser beam into a plurality of pulsed laser beams is disclosed. The apparatus uses a rotatable first optical refracting element to cause the incident laser beam to sweep the surface of an imaginary cone. A circular or elliptical array of fixed, second optical refracting elements is placed in the path of the sweeping beam. The array is mounted in a holder of nontransmissive material. As the beam sweeps past each of the fixed second optical refracting elements, it is transmitted by that element and then interrupted by the nontransmissive material separating that element from the next fixed second optical refracting element. As the beam sweeps a complete circle or ellipse, a pulsation effect is created by the repetitive transmission and interruption, giving rise to a plurality of pulsed output beams. Such apparatus can be used in a system for perforating a web of sheet material with pulsed laser beams.

8 Claims, 8 Drawing Figures

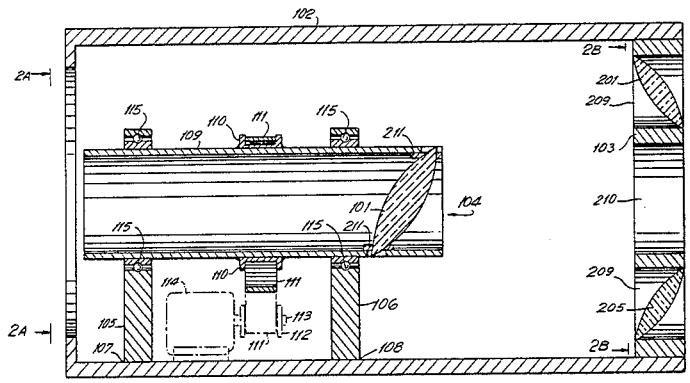

4,499,361

LASER BEAM INTERRUPTER AND DIVIDER

BACKGROUND OF THE INVENTION

This invention relates to apparatus for converting a continuous laser beam into several pulsed laser beams aimed at different targets. More particularly, this invention relates to an optical system for interrupting a continuous laser beam and dividing it into several pulsed beams directed at a moving paper web for the purpose of perforating multiple rows of holes in the web.

In the manufacture of cigarettes, for example, it is a common practice to perforate the cigarette paper or tipping paper in rows, for the purpose of providing smoke dilution. Before the laser became available, the perforations were made by mechanical means or with electrical spark perforators. With the advent of the laser, it became possible to achieve greater precision and speed than had previously been possible.

In creating a row of perforations using a laser, it is usually the practice to move the paper web while pulsing the laser beam. The maximum speed of the process is thus governed by the frequency at which the beam can be pulsed and the speed at which the web can be moved. With currently available laser equipment, the internal pulsation frequency of the laser is a limiting factor. Because of this, other means, external to the laser, for interrupting a continuous beam have been sought.

In addition, it is frequently desired to perforate the web at more than one location at a time. For example, it may be preferable to have two or more parallel rows of perforations. However, because of the increased capital and operating expenses, and space limitations, it it not desirable to use more than one laser to achieve such perforations.

Many optical systems have been developed to direct one beam to several locations simultaneously. In some systems, the splitting of the beam is accomplished by one or more semi-transmissive mirrors, or "beam splitters." A fraction of the radiation incident on each beam splitter is reflected to form a first beam, a certain small amount is absorbed, and the remainder is transmitted to form a second beam. The reflected beam, or the transmitted beam, or both, may be split again to form as many additional beams as are desired. Each beam so produced is then used to create a perforation in the paper.

The use of semi-transmissive mirrors as beam splitters has a number of serious drawbacks when applied to the task of perforating cigarette paper. The perforations formed in the cigarette paper should be uniformly sized to obtain the proper level of ventilation and other desired characteristics in the cigarette. As is well known to those in the art, however, it is difficult to cause the two beams provided by a beam splitter to have exactly a specific intensity ratio. As a result, the beams so obtained are very likely to produce holes of different sizes.

Other systems use mechanical rotary shutters, or "beam choppers," to periodically interrupt the beam at the desired pulsation frequency. Portions of the shutters may be mirrored in order to direct the pulsed beam to several different targets sequentially. However, when a beam is pulsed with a mechanical shutter, approximately half of the incident beam energy may be wasted during the "off" portions of the cycle. Still another type of beam chopping system diverts the beam to a heat sink, or "beam dump," during the "off" portions of the cycle. In such a system, up to 90% of the beam energy may be wasted.

SUMMARY OF THE INVENTION

It is an object of this invention, therefore, to provide a system for interrupting and dividing a laser beam with minimal energy loss. It is also an object of this invention to provide such a system without scattering, straying or other distortion of the beam.

It is a further object of this invention to provide an accurate and reliable laser perforation system for sheet material, particularly cigarette paper.

Still another object of this invention is to provide such a system with a minimum of moving parts, and a minimum of complexity.

These objects are accomplished using optical refracting elements, of which all but one are stationary.

In accordance with the present invention, there is provided an optical device for converting a single continuous incident laser beam into a plurality of pulsed beams. The device includes first optical refracting means and a plurality of second optical refracting means. The first optical refracting means is rotatable about the axis of the incident laser beam, and is aligned so that at least one of its refractive surfaces is at an oblique angle with respect to the axis of the incident beam. The beam is refracted by the first optical refracting means, and when the first optical refracting means is rotated, with means provided for that purpose, the refracted beam sweeps through a locus of points. The aforementioned second optical refracting means are fixedly mounted in an array spaced apart from each other, in a holder composed of a nontransmissive material, with the spaces separating the optical refracting means filled by this material.

The configuration and orientation of the array are chosen such that as the refracted beam sweeps through its rotational cycle, it impinges alternately on the optical refracting means and the separating material therebetween, sequentially impinging on each optical refracting means. This results in a pulsation effect as the beam is alternately transmitted by the optical refracting means and interrupted by the separating material, such that a plurality of pulsed beams emerges from the device.

BRIEF DESCRIPTION OF THE DRAWINGS

FIG. 1 is a side elevational view of a laser beam interrupting and dividing device according to the present invention;

FIG. 2 is a cross-sectional view of the apparatus of FIG. 1;

FIG. 2A is a front elevational view of the rotatable optical element of the apparatus of FIGS. 1 and 2, taken along line 2A—2A of FIG. 2;

FIG. 2B is a front elevational view of the stationary element array of the apparatus of FIGS. 1 and 2, taken along line 2B—2B of FIG. 2;

FIG. 3 is schematic optical diagram of the operation of the apparatus of FIGS. 1 and 2 wherein the optical elements are lenses;

FIG. 4 is a schematic optical diagram of the operation of the apparatus of FIGS. 1 and 2 wherein the optical elements are prisms;

FIG. 5 is a cross-sectional view of web perforation apparatus according to the present invention; and FIG. 6 is a perspective view of beam positioning optics for use with the apparatus of FIG. 5.

DESCRIPTION OF THE PREFERRED EMBODIMENTS

The preferred embodiments of the present invention can best be understood after a general consideration of the operating principles of the invention. The invention comprises a device for converting a single continuous incident laser beam into a plurality of pulsed output laser beams. The invention uses optical refracting elements, of which one such optical element is rotatable and the remainder are stationary.

The refracting optical elements may be prisms or lenses, or any other refracting elements. It is not necessary that all the elements be of the same type, although it is preferable that at least all of the stationary elements be of the same type, and even more preferable that the stationary elements be identical to each other.

The incoming laser beam is incident first on the non-stationary element. This element is mounted so as to be rotatable about the axis of the incident beam. The element is oriented so that at least one of its refracting surfaces is at an oblique angle with respect to the incident beam at the point of incidence thereon. Normally, in the case of a lens or prisms, the refracting surface will be either the leading or trailing face of the element or both, although other, less conventional elements with additional faces may be employed, as long as at least one face is at an oblique angle with respect to the incident beam.

If the incoming beam were incident on the first element while the element was stationary, the beam would be refracted through some angle, related to the oblique angle at which it strikes the refracting surface or surfaces, and related also to the index of refraction of the material of which the element is made. The specific angle can be determined for a particular configuration by means of Snell's Law of Refraction, which can be written as follows:

$$n_1 \sin \theta_1 = n_2 \sin \theta_2$$

A ray of light passing from a medium of index of refraction $n_1$ to a medium of index of refraction $n_2$, and incident on the boundary at angle $\theta_1$ with respect to the normal, will be transmitted from the boundary at angle $\theta_2$ with respect to the normal.

If the first element is rotated about the incident beam axis, the refracted beam will sweep through a locus of points which defines the surface of a cone. The apex of the cone will be collinear with the incident beam axis, although because there is likely to be refraction at more than one surface of the element, the apex may fall in front of the element, behind it, in it, or on one of its surfaces. The half-angle of the cone will be determined by the angles at which the refracted beam emerges from each refracting surface.

The remaining optical elements, which are stationary, are mounted in an array within a holder made from any opaque material which is capable of absorbing the beam energy (e.g., black anodized aluminum). Preferably, the holder is water-cooled by conventional means to remove the heat generated by beam absorption. The array is configured so that it is traced by the sweeping refracted beam. The proper configuration will generally be an ellipse or, most preferably, a circle, in which case the holder is preferably formed as an annulus.

The number and placement of stationary elements within the array should correspond to the number and placement of the desired output beams. If a circular array is being used, the annulus is positioned so that it is centered so the axis of the cone and perpendicular thereto, such that it forms a base for the cone. The diameter of the array will usually be chosen based on the desired separation distances of the output beams, but for any combination of array diameter and cone half-angle there is a distance from the first element at which the remaining elements will intercept the refracted beam as it sweeps.

Within the array, each of the stationary elements is mounted with respect to the plane of the array at an angle which is chosen so that the beam emerging from each element has the same orientation with respect to the cone axis as the beam emerging from each of the other elements. Assuming that the elements are identical, as is preferred, the mounting angles are chosen so that each element is at the same angle with respect to the refracted beam as it sweeps that particular element.

As the refracted beam sweeps the array by virtue of the rotation of the first element by means provided therefor, it is alternately transmitted by sequential stationary elements and absorbed by sequential opaque separating sections of the annulus. The result is that a beam in the form of a series of pulses emerges from each stationary element at a rate of one pulse per element per sweep cycle, which is equal to the frequency of rotation of the first element. The duration of each pulse is slightly less than T/n, where T is the sweep period and n is the number of stationary elements. Of course, the pulse duration need not be a constant, and can be varied by providing different spacing between each stationary element.

The deviation of pulse duration from T/n is due to the small amount of opaque material between elements. Some opaque material is necessary to cause the pulsation effect, but the dimensions are chosen to keep the amount of opaque material, and therefore the energy loss, at a minimum.

Because no beam splitters are employed, each beam pulse transmitted from the device of this invention has substantially the same energy as the incident beam, with the exception of possible small, uniform losses within the optical elements themselves. The present invention is therefore more energy efficient than previous systems employing beam splitters. Further, because each beam passes through an optical element before impinging on its target, it is properly aimed and focused at the correct target point.

The pulsed output beams can be used to perforate a web of sheet material such as cigarette paper by transporting such material past the output beams.

One preferred embodiment of an optical apparatus according to this invention is illustrated in FIGS. 1, 2, 2A and 2B. In this embodiment, all of the optical elements, shown at 101 and 201 to 208, are lenses, although they can in general be any combination of refracting optical elements suitable for use with lasers.

The apparatus has a frame 102, which supports an opaque holder 103, preferably in the form of an annulus, and the rotatable lens arrangement indicated generally at 104. Stationary lenses 201 to 208 are received in specially adapted openings 209 in annulus 103. Annulus 103 could also be a solid disk or other solid form, but providing a circular form with an opening 210 conserves material.

Rotatable lens arrangement 104 rests on precision bearings 105 and 106, connected to frame 102 at 107 and 108, and including ball bearings 115. Optical tube 109, in which lens 101 (shown in phantom in FIG. 1) is held at an angle by adjustable seats 211, is journalled in bearings 105 and 106. Optical tube 109 has pulley 110 at the approximate midpoint thereof, over which timing belt 111 passes. Timing belt 111 also passes over pulley 112, connected by shaft 113 to variable speed motor 114. It is easily seen that operation of variable speed motor 114 will cause the rotation of optical tube 109 and lens 101 therein.

In accordance with the present invention, the axis of rotation of lens 101 must coincide with the axis of incident laser beam 301. The apparatus of FIGS. 1 and 2 causes the lens to rotate about an axis passing through its geometric center. Therefore, when using such apparatus, the beam must be made incident along that axis. It remains within the scope of this invention, however, to cause the lens to rotate eccentrically, as long as the axis of the beam is collinear with the axis of rotation.

FIG. 3 is a schematic optical diagram illustrating the function of the optical apparatus of FIGS. 1, 2, 2A and 2B. The solid lines represent the function when lens 101 is in the position shown in FIG. 1. The dashed lines represent the function when lens 101 is rotated 180 degrees from that position.

As shown, incident beam 301 undergoes first and second refractions at point 302 and point 303 on the leading and trailing surfaces, respectively, of lens 101, emerging as refracted beam 304. Beam 304 undergoes further refractions at point 305 and point 306 on the surfaces of stationary lens 201, emerging as beam 307, substantially parallel to beam 301. With lens 101 rotated 180 degrees from its initial position, as indicated at 101', beam 301 undergoes refractions at point 302 and point 303', emerging as beam 304'. Beam 304' is further refracted at point 305' and point 306' by lens 205, emerging as beam 307', parallel to beam 301 and beam 307. Beams 304 and 304' represent the extreme positions of refracted beam 301. The locus of points swept by the refracted beam 304/304' is a cone with its apex at 308 and a half-angle α, shown. In this case, apex 308 is downstream of lens 101. However, as generally discussed above, apex 308 could be located elsewhere with respect to lens 101, e.g., upstream of the lens.

FIG. 4 is a schematic optical diagram illustrating an alternative embodiment of the present invention wherein right triangular prisms are used in place of lenses. In the initial position, again indicated by the solid lines, beam 401 is incident on prism 402 at point 403. There is no appreciable refraction because the beam 401 impinges on the leading surface of prism 402 substantially at right angles to that surface. The beam 401 is refracted by the trailing surface at point 404, emerging as beam 405. Beam 405 is refracted by prism 406 at point 407 and point 408, emerging as beam 409. When prism 402 is rotated 180 degrees to the position shown in dashed lines and indicated as 402', the beam is again appreciably refracted for the first time at point 404, emerging as beam 405'. Beam 405' is refracted at point 407' and point 408' by prism 406', emerging as beam 409'. As in the prior embodiment, the locus of points swept by the refracted beam 405/405' defines the surface of a cone. In this embodiment, the apex of the cone lies on the trailing surface of the prism at refraction point 404. β represents the half-angle of the cone.

Note that by using right-triangular prisms it is possible to use first prism 402 and second prisms 406/406' with identical wedge angles, γ, in which case the beam is substantially perpendicular to the trailing surface of the second prism 406 or 406' after being refracted by the leading surface, so that there is substantially no refraction at point 408 or point 408'.

With regard to both FIGS. 3 and 4, a plurality of pulsed beams is generated as the refracted beam 304/304' or 405/405' sweeps between the positions shown and alternately impinges on sequential optical elements and sequential separating portions of the annulus. As described in more detail above, the absorption of the beam as it impinges on sequential separating portions gives rise to a pulsation effect in each output beam.

In the case in which prisms are used as the stationary elements, the beam path will be substantially as indicated in FIG. 4 for the entire period during which the beam sweeps the face of each prism. This is because the optical cross-section of a prism is substantially uniform throughout.

However, the cross-section of a spherical lens of the type shown in FIG. 3 is not uniform across its face. Therefore, the beam path will only be as shown in FIG. 3 for that period in which the beam is sweeping the central portion of the lens. The beam will be misdirected as it sweeps the edges. To maintain efficient use of the beam in such a case, it is necessary to use further optics (not shown) downstream of the secondary elements to collect the beam and redirect it to the proper target.

Alternatively, one could configure the lens to direct the beam to the target regardless of where on its face the beam impinges. For example, an aspheric lens could be fashioned from wedge-shaped segments of spherical lenses. Another possibility is to use a Fresnel-type lens in which each annular refracting surface is at a different angle with respect to the optical axis. These and other alternatives would be familiar to one of ordinary skill in the art.

FIG. 5 represents a web perforation system which embodies the present invention. An optical stage identical to the optical apparatus of FIGS. 1, 2, 2A and 2B, is shown with like reference characters representing like parts, but with prisms 501, 502 and 503 substituted for lenses 101, 201 and 205, to show one alternative choice of optical elements. In addition, this figure depicts a laser 504, additional optics 507-510, and a web 505 of sheet material passing over rollers 506.

The production of multiple pulsed beams is generally as described above in connection with FIGS. 3 and 4. The beam interrupted and divided in the above-described way is transmitted from the collecting element (e.g., 502, 503) to a positioning mirror (507, 508, respectively) and a final focusing lens (509, 510, respectively) and is directed onto the web 505. Similar positioning mirrors and focusing lenses are associated with each of the other collecting elements (not shown) in the array.

Alternatively, more complex positioning optics such as those illustrated in FIG. 6 may be employed. As shown, output beam 601 is reflected by mirrors 602, 603, which are aligned at compound angles, before passing through focusing lens 604 to web 505. Such an arrangement would be useful where precision placement of the beam is necessary. For example, it could be used to align the eight output beams of the apparatus of FIG. 5 to form two closely-spaced parallel rows of perforations.

Thus, a simple efficient apparatus for converting a single continuous laser beam into a plurality of pulsed beams, for protection of a web or other applications, has been disclosed. Those skilled in the art will recognize that the inventive principles discussed herein can be practiced with apparatus other than that specifically described above.

I claim:

1. Optical apparatus for converting a single continuous incident laser beam into a plurality of pulsed laser beams, comprising:
   a rotatable first optical refracting means, said laser beam being incident thereon, said first optical refracting means intersecting the axis of said incident beam and refracting said beam with respect to said incident beam axis,
   means for rotating said first optical refracting means about said incident beam axis such that rotation of said first optical refracting means causes said refracted laser beam to sweep through a locus of points,
   and a plurality of fixed second optical refracting means arrayed within a holder of nontransmissive material and spaced apart by portions of said holder;
   the configuration of said array, its distance from and orientation with respect to said rotatable first optical refracting means and the spacing between each of said second optical refracting means being selected such that said refracted beam impinges alternately on sequential ones of said plurality of fixed second optical refracting means and of said separating portions of said holder;
   the transmission of said refracted beam being substantially interrupted by said nontransmissive material of said holder when said beam impinges thereon and said beam being further refracted by each of said fixed second optical refracting means when said beam impinges thereon, such that a plurality of pulsed laser beams emerges from said optical apparatus.

2. The optical apparatus of claim 1, wherein said first and second optical refracting means comprise lenses.

3. The optical apparatus of claim 1, wherein said first and second optical refracting means comprise prisms.

4. The optical apparatus of claim 1, wherein said holder is annular.

5. A system for perforating a web of paper, comprising:
   a continuous laser beam source;
   an optical stage comprising:
   a rotatable first optical refracting means, the continuous beam from said source being incident thereon, said first optical refracting means intersecting the axis of said incident beam and refracting said beam with respect to said incident beam axis,
   means for rotating said first optical refracting means about said incident beam axis, such that rotation of said first optical refracting means causes said refracted laser beam to sweep through a locus of points,
   a plurality of fixed second optical refracting means arrayed within a holder of nontransmissive material and spaced apart by portions of said holder,
   the configuration of said array, its distance from and orientation with respect to said rotatable first optical refracting means and the spacing between each of said second optical refracting means being selected such that said refracted beam impinges alternately on sequential ones of said plurality of fixed second optical refracting means and of said separating portions of said holder,
   the transmission of said refracted beam being substantially interrupted by said nontransmissive material of said holder when said beam impinges thereon and said beam being further refracted by each of said fixed second optical refracting means when said beam impinges thereon, such that a plurality of pulsed laser beams emerges from said optical stage;
   and means for transporting a web of paper such that said plurality of pulsed laser beams impinges on said web for perforation of the web.

6. The paper perforating system of claim 5, wherein said first and second optical refracting means comprise lenses.

7. The paper perforating system of claim 5, wherein said first and second optical refracting means comprise prisms.

8. The paper perforating system of claim 5, wherein said holder is annular.

* * * * *

UNITED STATES PATENT AND TRADEMARK OFFICE
CERTIFICATE OF CORRECTION

PATENT NO. : 4,499,361

DATED : February 12, 1985

INVENTOR(S) : Reiner G. Brinker

It is certified that error appears in the above-identified patent and that said Letters Patent is hereby corrected as shown below:

Column 1, line 34, "it" (second occurrence) should be --is--.

Column 7, line 5, "protection" should be --perforation--.

Signed and Sealed this

Eighth Day of July 1986

[SEAL]

Attest:

DONALD J. QUIGG

Attesting Officer

Commissioner of Patents and Trademarks